(12) United States Patent
Kaku

(10) Patent No.: US 7,295,231 B1
(45) Date of Patent: Nov. 13, 2007

(54) DIGITAL CAMERA

(75) Inventor: Junya Kaku, Itami (JP)

(73) Assignee: Sanyo Electric Co., Ltd., Moriguchi-Shi (JP)

( * ) Notice: Subject to any disclaimer, the term of this patent is extended or adjusted under 35 U.S.C. 154(b) by 0 days.

(21) Appl. No.: 09/417,705

(22) Filed: Oct. 13, 1999

(30) Foreign Application Priority Data

Oct. 14, 1998 (JP) ............................ 10-291995

(51) Int. Cl.
*H04N 5/76* (2006.01)
*H04N 5/228* (2006.01)

(52) U.S. Cl. .................. 348/231.6; 348/222.1

(58) Field of Classification Search ............ 348/220.1, 348/222.1, 231.99, 231.6, 231.9, 307, 333.11, 348/333.05
See application file for complete search history.

(56) References Cited

U.S. PATENT DOCUMENTS

| | | | | |
|---|---|---|---|---|
| 5,262,871 A | * | 11/1993 | Wilder et al. ............... | 348/307 |
| 5,428,389 A | * | 6/1995 | Ito et al. .................... | 348/231.6 |
| 5,463,419 A | * | 10/1995 | Saito ........................ | 348/231.9 |
| 5,734,427 A | * | 3/1998 | Hayashi ................. | 348/333.11 |
| 5,835,164 A | * | 11/1998 | Kanai et al. ................ | 348/742 |
| 5,920,343 A | * | 7/1999 | Watanabe et al. ........ | 348/222.1 |
| 6,292,218 B1 | * | 9/2001 | Parulski et al. .......... | 348/220.1 |
| 6,295,596 B1 | * | 9/2001 | Hirabayashi et al. ....... | 714/762 |
| 6,628,328 B1 | * | 9/2003 | Yokouchi et al. ........ | 348/221.1 |
| 6,661,452 B1 | * | 12/2003 | Nishikawa ............... | 348/222.1 |

FOREIGN PATENT DOCUMENTS

| | | |
|---|---|---|
| JP | 05-100647 | 4/1993 |
| JP | 5-328298 | 12/1993 |
| JP | 07-312714 | 11/1995 |
| JP | 08-006528 | 1/1996 |
| JP | 08-083347 | 3/1996 |
| JP | 8-214258 | 8/1996 |
| JP | 8-280025 | 10/1996 |
| JP | 09-163294 | 6/1997 |
| JP | 10-84532 | 3/1998 |
| JP | 10-108121 | 4/1998 |

* cited by examiner

*Primary Examiner*—David Ometz
*Assistant Examiner*—Luong T. Nguyen
(74) *Attorney, Agent, or Firm*—Kratz, Quintos & Hanson, LLP.

(57) ABSTRACT

A digital camera includes a monitor. When outputting through-images on the monitor, high-resolution YUV data outputted from a signal processing circuit is thinned out and created into low-resolution YUV data. The low resolution YUV data of a current frame is written to one of banks formed within an SDRAM in 1/15 second. On the other hand, the low resolution YUV data of the preceding frame is read out of the other bank in 1/30 second. That is, reading is made twice within 1/15 second. The low resolution YUV data thus read is thereafter processed by an NTSC encoder and outputted onto the monitor.

9 Claims, 5 Drawing Sheets

DIGITAL CAMERA

BACKGROUND OF THE INVENTION

1. Field of the Invention

This invention relates to digital cameras and, more particularly, to a digital camera for displaying subject motion images (through images) real time on the monitor.

2. Description of the Prior Art

Where displaying subject through-images having been shot by a digital camera on a built-in monitor, the display image if utilizing an NTSC format requires to be renewed every 1/30 second. Due to this, the shot image data on each frame has to be processed within a brief time, in order to be in time for renewal timing. Meanwhile, the increase in the number of pixels for the CCD imager, in turns, increases the data amount of each frame. Accordingly, process failure might result unless an improvement is contemplated for the processing method.

For this reason, in the conventional digital cameras having pixels in number exceeding one million for example, the pixels to be read out of the CCD imager are subjected to thinning out prior to being outputted for through-images. That is, this includes a process that all the pixels are read out upon depressing the shutter button. However, when outputting a through-image, pixel thinning-out is implemented in order to decrease the amount of data.

However, the conventional method includes switching the pixel read-out scheme between upon outputting through-images and at pressing on the shutter. Consequently, there has been a problem that the CCD imager is complicated in control and hence the circuit therefor becomes complex in configuration.

SUMMARY OF THE INVENTION

It is therefore an object of the present invention to provide a novel digital camera which is capable of preventing against process failure.

A digital camera according to the present invention, comprises: an image sensor having a first resolution; a timing generator for reading a first resolution image signal from the image sensor; a first processor for performing predetermined signal processing on the first resolution image signal; a thinning-out circuit for thinning out the first resolution image signal outputted from the first processor and creating a second resolution image signal with a resolution lower than the first resolution; a main memory having at least two memory areas; a selector for selecting alternately the two memory areas; a write controller for writing the second resolution image signal to one of the two memory areas based on an output of the selector; and a read controller for reading a second resolution image signal from the other of the two memory areas based on an output of the selector.

The timing generator reads a first resolution image signal from an image sensor having a first resolution. The first processor performs a predetermined process on the first resolution image signal read from the image sensor. The first resolution image signal outputted from the first processor is thinned out by the thinning-out circuit, being created into a second resolution image signal with a lower resolution than the first resolution. On the other hand, the main memory has at least two memory areas. The selector selects alternately the two memory areas. The write controller writes the second resolution image signal to one of the two memory areas, based on an output of the selector. The read controller reads the second resolution image signal from the other of the two memory areas, based on an output of the same selector.

According to the invention, because the first resolution image signal is thinned out and created into a second resolution image signal with a low resolution, no failure will be encountered in signal processing even where the CCD imager has an increased resolution. Meanwhile, while writing is being made to one memory area, reading is effected from the other memory area. Accordingly, even where there is difference in operation speed between the areas, the operation on one area will not outpace the operation on the other area. Thus, output images are free from disturbance.

In one aspect of the invention, the timing generator reads out the first resolution image signal in an amount of one screen at an interval of a first predetermined period, and the read controller reading out the second resolution image signal in an amount of one screen at an interval of a second predetermined period shorter than the first predetermined period. In one embodiment of the invention, the second predetermined period is 1/Nth (N is an integer equal to or greater than 2) of the first predetermined period. On another embodiment of the invention, the selector alternately switches for a memory area to be selected at an interval of the first predetermined period.

In another aspect of the invention, on a monitor is displayed an image corresponding to an image signal read by the read controller.

In another aspect of the invention, when an instruction key is depressed, a second processor outputs a first disable signal, second disable signal and third disable signal at predetermined timing. The thinning-out circuit is disabled by the first disable signal simultaneously with the operation of the instruction key. The read controller also is disabled by the second disable signal simultaneously with the operation of the instruction key. On the other hand, the write controller writes the first resolution image signal outputted from the first processor to the main memory and disabled by the third disable signal after the first resolution image signal in an amount of one screen has been written.

In one embodiment of the invention, a recorder records the first resolution image signal written on the main memory to a recording medium. The second processor cancels the second disable signal from outputting after the first resolution image signal has been recorded. As a result, the read controller reading the first resolution image signal from the main memory.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
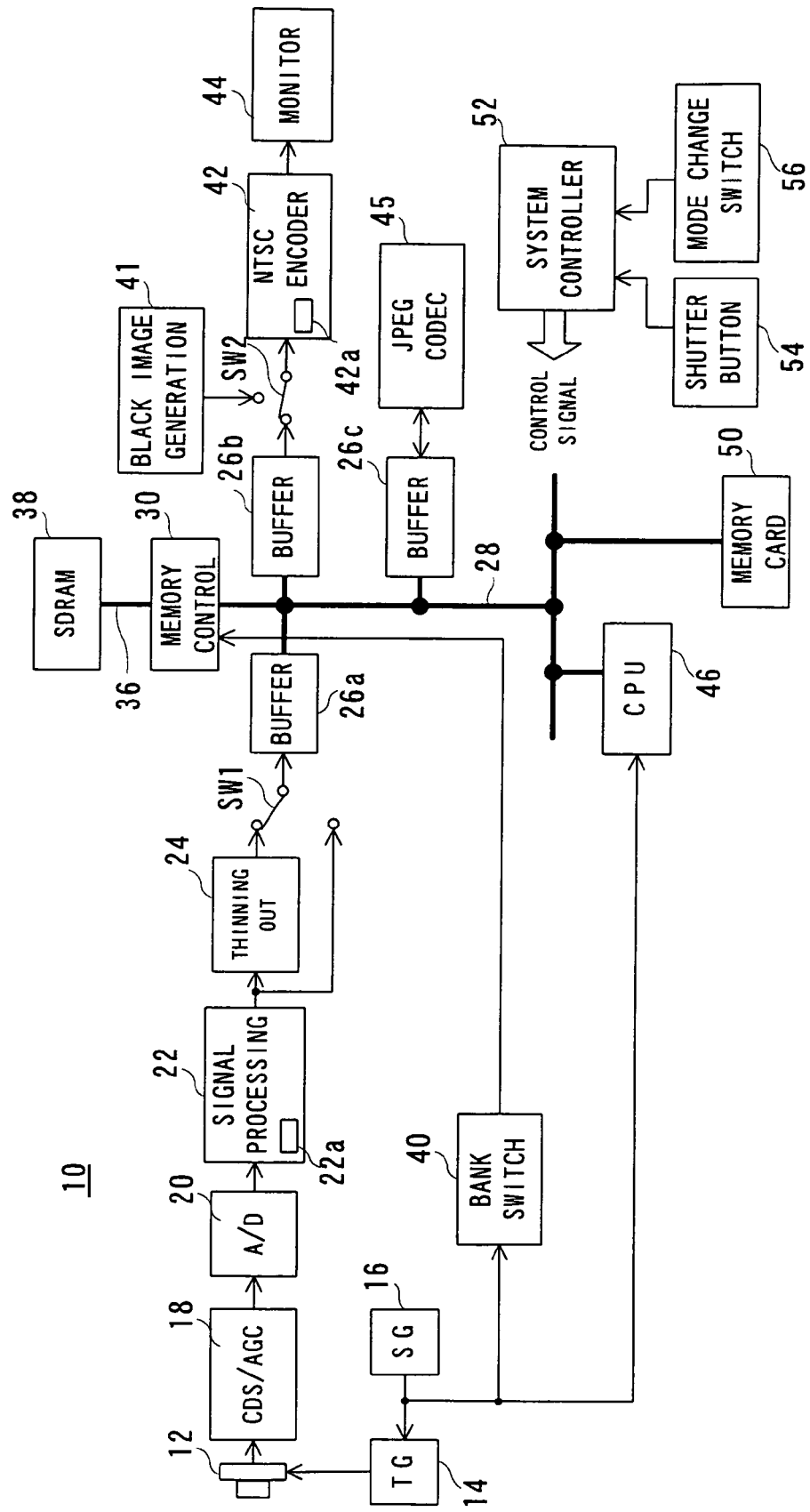
FIG. 1 is a block diagram showing one embodiment of the present invention.

Referring to FIG. 1, a digital camera 10 of this embodiment includes a CCD imager 12. The CCD imager 12 has a not-shown color filter mounted at a front thereof. An image of a subject is given to the CCD imager 12 through the color filter.

If an operator operates a mode set switch 56 to a side of camera, a system controller 52 sets for a camera mode. At this time, the CPU 46 starts a signal generator (SG) 16 so that the signal generator (SG) 16 can output a horizontal synchronizing signal and a vertical synchronizing signal. Based on the output horizontal and vertical synchronizing signals, a TG 14 creates a timing signal to drive the CCD imager 12 by a progressive scan scheme. The CCD imager 12 has vertical lines in number of "1024" and horizontal pixels in number of "768", so that a camera signal (high resolution camera signal) can be outputted with a resolution of XGA. Incidentally, it takes $1/15$ second to output a camera signal for each frame.

The output camera signal from the CCD imager 12 is a signal that each pixel has any one of color components. The camera signal thus configured is subjected to well-known noise removal and level adjustment by a CDS/AGC circuit 18, and then converted into camera data as a digital signal by an A/D converter 20. A signal processing circuit 22 performs YUV conversion with a ratio of 4:2:2 on the camera data outputted from the A/D converter, thus creating YUV data (high resolution YUV data).

To display real-time motion images (through images) of a subject on a monitor 44, a switch SW1 is connected to a side of a thinning-out circuit 24. That is, the thinning-out circuit 24 is enabled during outputting through-images. The output high-resolution YUV data from the A/D converter 20 is thinned out by the thinning-out circuit, thereby converted into YUV data (low resolution YUV data) having vertical lines in number of "768" and horizontal pixels in number of "480". It should be noted that the pixel data constituting the low resolution YUV data is intermittently outputted without putting close together the pixel data correspondingly to thinning-out.

The low resolution YUV data outputted from the thinning-out circuit 24 is sent to a buffer 26a via the switch SW1. The buffer 26a is configured by a dual port SRAM having a capacity corresponding to 128-pixels YUV data. The low resolution YUV data is consecutively written onto the buffer 26a by a buffer write circuit 22a provided in the signal processing circuit 22. That is, the pixel data is put close together in order to eliminate missing portions incurred due to thinning out. This process provides the pixels with an equivalent pitch to that of pixels of before the thinning-out operation.

The YUV data written on the buffer 26a is read out by a memory control circuit 30 before overwritten by the succeeding YUV data. The memory control circuit fetches the read YUV data through a bus 28, and thereafter writes it to an SDRAM 38 through a bus 36. The clock rate to read data from the buffer 26a is set 4 times a clock rate to write data to the buffer 26a. The buses 28 and 36 are occupied to transfer YUV data from the buffer 26a to the SDRAM 38 in a duration of a quarter of the total period.

Figure 2:
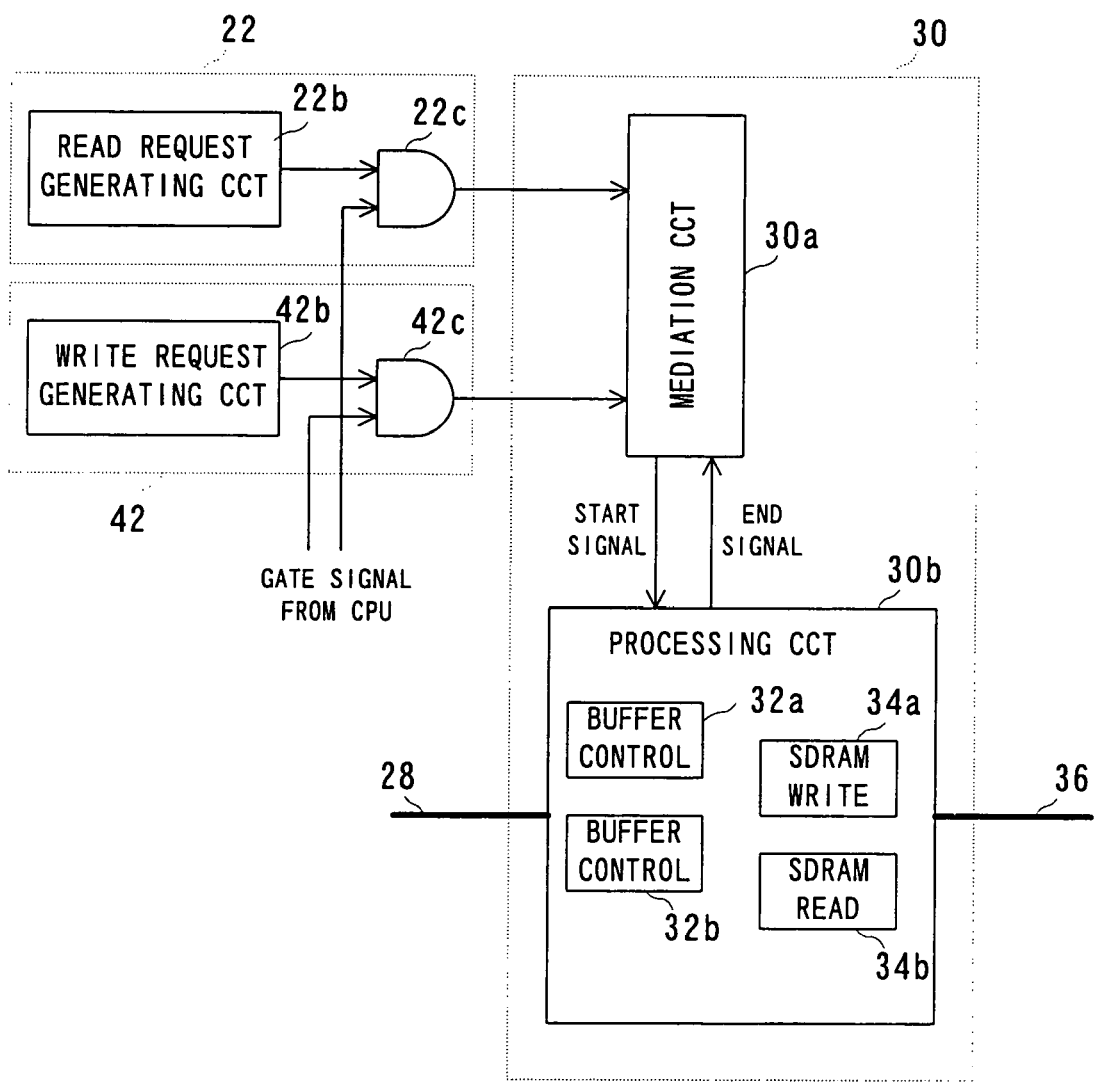
FIG. 2 is a block diagram showing one part of the FIG. 1 embodiment.

Explanation will be concretely made on write operation to the SDRAM 38 with reference to FIG. 2. A read request generating circuit 22b included in the signal processing circuit 22 generates a read request at predetermined timing. A write request generating circuit 42b included in an NTSC encoder 42 also generates a write request at predetermined timing. During outputting through-images, the CPU 46 sends a high level gate signal to AND circuits 22c and 42c. This opens the gate to thereby input read and write requests to a mediation circuit 30a. The mediation circuit 30a mediates between the requests, and outputs a predetermined start signal to the processing circuit 30b in order to respond to any of the requests.

To process for a read request from the signal processing circuit 22b, the buffer control circuit 32a sends an address signal to the buffer 26a in response to the start signal and reads YUV data out of the buffer 26a. The read YUV data is fetched into the processing circuit 30b via a bus 28. An SDRAM write circuit 34a writes the fetched YUV data onto the SDRAM 38 through the bus 36. Because the occupation over the buses 28 and 36 at all times excludes other of processing, the processing circuit 30b outputs an end signal to the mediation circuit 30a each time 64-pixels YUV data has been written, thereby opening over buses 28 and 36. Then the mediation circuit 30a enters a next requests process. In this manner, the read requests sent from signal processing circuit 22 are processed in a plurality of number of times, thereby writing 1-frame low resolution YUV data onto the SDRAM 38 in $1/15$ second.

When processing a write request from the NTSC encoder 42, the mediation circuit 30a outputs a predetermined start signal to the processing circuit 30b in response to a write request input. An SDRAM read circuit 34b, in turn, reads YUV data out of the SDRAM 38. Also, a buffer control circuit 32b writes the YUV data read by the SDRAM 38 onto the buffer 26b. The processing circuit 30b generates an end signal when 64-pixels YUV data have been read out, similarly to the above. This puts the buses 28 and 36 open. This operation is repeatedly done, whereby 1-frame low resolution YUV data is read out of the SDRAM 38 in $1/30$ second. Incidentally, the buffer 26b is also configured by a dual port SRAM having a capacity to store 128 pixels of YUV data.

Figure 3:
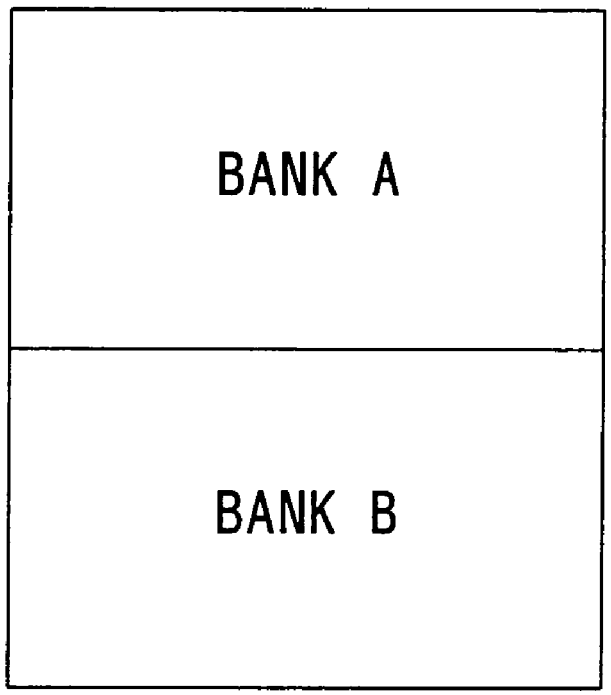
FIG. 3 is an illustrative view showing one SDRAM.

The SDRAM 38 includes a bank A and bank B, as shown in FIG. 3. A bank switch circuit 40 outputs a bank switch pulse having a level varying every $1/15$ second, based on vertical and horizontal synchronizing signal outputted from the SG 16. The SDRAM write circuit 34a assigns a write destination as a bank A when the bank switch pulse is in a high level, and as a bank B when the bank switch pulse is in a low level. On the other hand, the SDRAM reads circuit 34b assign a read destination as a bank B when the bank switch pulse is in a high level, and as a bank A when the bank switch pulse is in a low level. That is, the write and read operations to and from the SDRAM 38 are complementarily done wherein, when one bank is being written by data, the other bank is read of data.

As described above, it takes $1/15$ second to write 1 frame of YUV data whereas 1-frame YUV data is completely read out in $1/30$ second. Also, the level of a bank switch pulse is changed at an interval of $1/15$ second. Due to this, while the YUV data of a current frame is written to one bank, the YUV data of the preceding frame is repeatedly read out twice. In this manner, there is difference between a time period required for writing and a time period required for reading. Accordingly, if there is provided only one bank, read scanning will outpace write scanning. This results in appearance of a horizontal line on the monitor 44. In order to eliminate such a problem, this embodiment provides the SDRAM 38 with two banks so that write and read operations to and from the banks can be made in a complementary manner.

The buffer read circuit 42a provided in the NTSC encoder 42 reads YUV data stored in the buffer 26b at a quarter rate of a clock of writing. Furthermore, the read YUV data is encoded by an NTSC format. The encoded data is converted by a D/A converter (not shown) into an analog signal to be outputted onto the monitor 44. As a result, through-images are displayed on the monitor 44.

In this manner, when outputting through-images, thinning out is performed on high resolution YUV data to be created every $\frac{1}{15}$ second. Thus, YUV data with a decreased resolution down to as low as nearly VGA is outputted from the thinning-out circuit 24 every $\frac{1}{15}$ second. That is, the number of pixels is decreased, the pitch of pixels is increased at thinned-out portions, and the data amount per unit time is decreased. The data amount per unit time is decreased at every portion of the image, with a result that no process failure will be encountered in the course of intermittently writing the data onto the SDRAM 38.

Meanwhile, because the CCD imager 12 outputs camera signals only every $\frac{1}{15}$ second, the duration that the buses 28 and 36 are occupied by transfer of the low resolution YUV data to the SDRAM 38 is reduced down to a half of the conventional. That is, conventionally the camera signals produced every $\frac{1}{30}$ second by the CCD imager have been decreased in resolution when outputted from the CCD imager. Due to this, the low resolution YUV data of each frame must have been written to the SDRAM 38 within $\frac{1}{30}$ second. Contrary to this, in this embodiment the occupation ratio over the buses 28 and 36 can be reduced to a half of the conventional because the low resolution YUV data of each frame may be written within $\frac{1}{15}$ second.

However, the low resolution YUV data must be completely read out of the SDRAM 38 within $\frac{1}{30}$ second. Accordingly, the occupation ratio over the buses 28 and 36 during reading is twice a ratio of writing. In other words, the reading from SDRAM 38 is at a twice rate of a rate of writing to the SDRAM 38. To realize this, the present embodiment provides two banks in the SDRAM 38 so that the bank to be written and the bank to be read are switched between in a complementary manner. Thus, the through-image displayed on the monitor 44 is prevented from being deteriorated in image quality.

If the operator operates the shutter button 54, the CPU 46 connects the switch SW1 to the signal processing circuit 22. Also, the gate signal to the AND circuit 42c shown in FIG. 2 is decreased to a low level to apply gating to a write request. This disables the thinning-out circuit 24, the SDRAM read circuit 34b and the buffer control circuit 32b. The high resolution YUV data outputted from the signal processing circuit 22 is written to the buffer 26a without being processed of thinning-out. This high resolution YUV data is read out of the buffer 26a by the buffer control circuit 32a each time a read request is outputted from the signal processing circuit 22, and written to the SDRAM 34 by the SDRAM control circuit 34a. In also this case, the bank to be written is determined according to a bank switch signal. Incidentally, the banks A, B each possesses a capacity that can afford to store 1-frame high resolution YUV data. When low resolution YUV data is processed, the bank is utilized at a part thereof.

The high resolution YUV data is greater in the number of pixels than the low resolution YUV data, hence requiring a correspondingly longer time in being written onto the SDRAM 38. However, the occupation ratio over buses 28 and 36 is decreased correspondingly to suspension of data reading from the SDRAM 38. This reduction of occupation ratio is allocated to data writing onto the SDRAM 38. Consequently, there is no possibility that process failure occurs during writing the high resolution YUV data onto the SDRAM 38.

When the high resolution YUV data has been completely written to the SDRAM 38, i.e., when elapsing $\frac{1}{15}$ second from depressing the shutter button 54, the CPU 46 also reduces to a low level the gate signal to be supplied to the AND circuit 22c shown in FIG. 2. This applies gating also to the read request, thus suspending the writing to the SDRAM 38.

Incidentally, the switch SW2 is connected to a black image generating circuit 41 in response to operation of the shutter button 54. This supplies black image data to the NTSC encoder 42. Thus, a black image is displayed on the monitor 44 simultaneously with pressing on the shutter.

The 1-frame high resolution YUV data stored within the SDRAM 38 is delivered to the JPEG CODEC 45 where it is subjected to JPEG compression. The resulting compression data is once written to the SDRAM 38, and thereafter recorded onto a memory card 50. After completing the recording, the switch SW2 is returned and further the gate signal to be supplied to the AND circuit 42c is returned to the high level. Due to this, the high resolution YUV data stored within the SDRAM 38 is read out, and the display on the monitor 44 is turned from the black image to a freeze image. When the freeze image is displayed, the SDRAM 38 is kept suspended from being written on, providing a corresponding amount of vacancy to the buses 28 and 36. Accordingly, no process failure will occur in the buffer 26 despite the number of pixels of the high resolution YUV data is greater than that of the low resolution YUV data.

Incidentally, the monitor 44 has a resolution that is lower than any of the high resolution YUV data and the low resolution YUV data. Consequently, the NTSC encoder 42 performs thinning-out on the high resolution YUV data and low resolution YUV data in conformity to their number of pixels.

Figure 4:
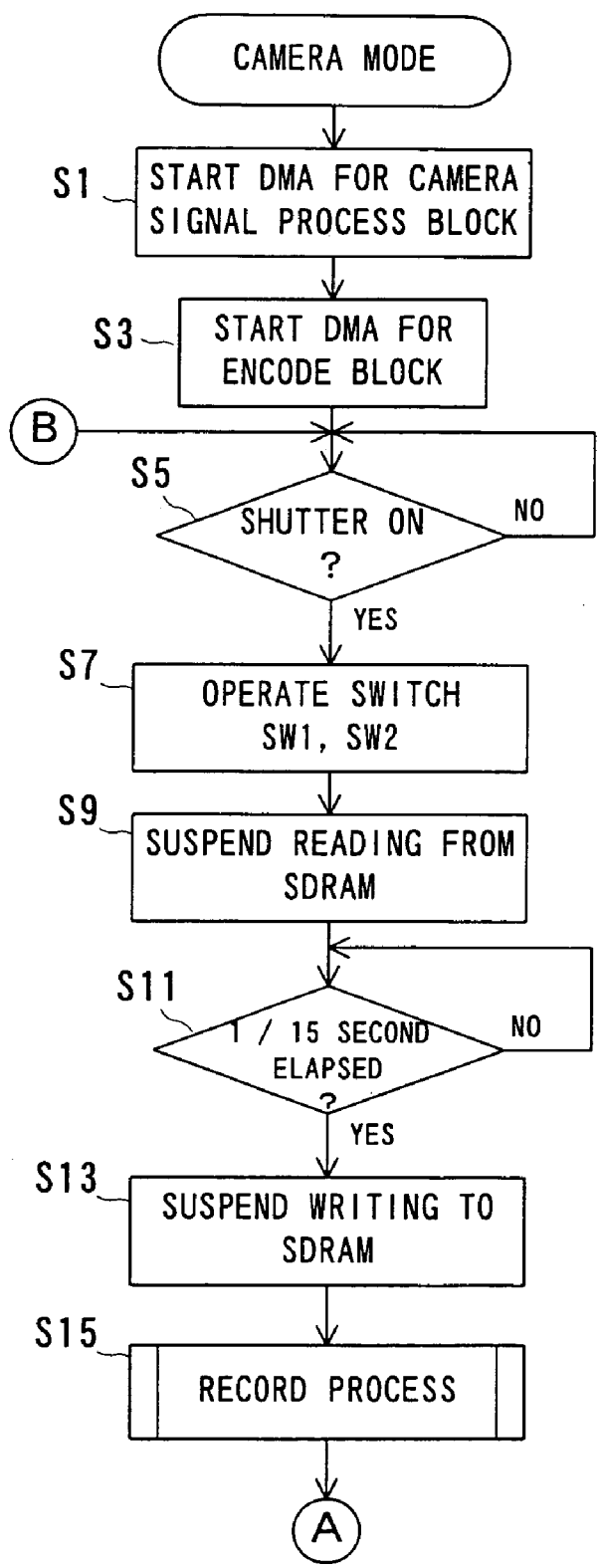
FIG. 4 is a flowchart showing one part of operation in the FIG. 1 embodiment.
Figure 5:
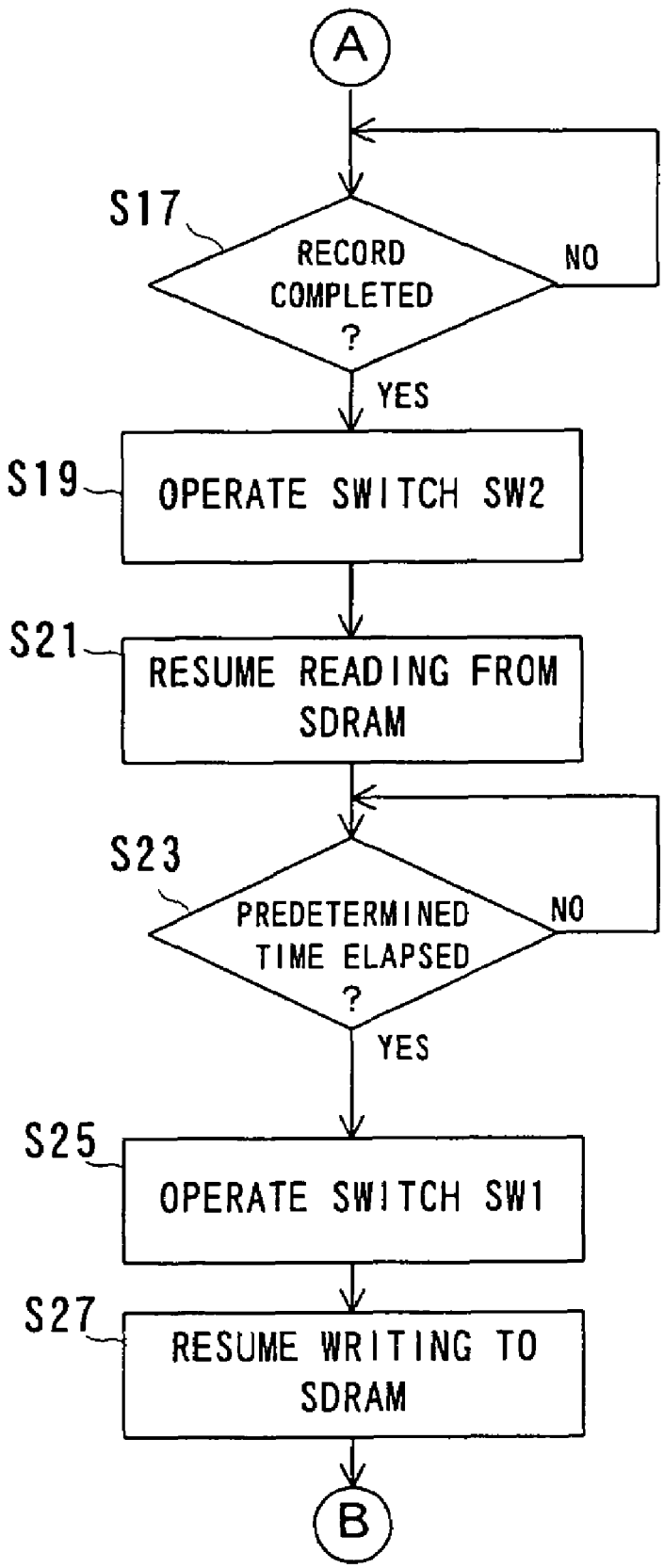
FIG. 5 is a flowchart showing another part of operation of the FIG. 1 embodiment.

The CPU 46 processes concretely a flowchart shown in FIG. 4 and FIG. 5. First, in step S1 DMA is started for a camera signal process block. That is, the SG 16 is started, and the switch SW1 is connected to the thinning-out circuit 24 and a high level gate signal is supplied to the signal processing circuit 22. The signal processing circuit 22 writes low resolution YUV data onto the buffer 26a and sends a read request to the memory control circuit 30. As a result, the low resolution YUV data is written to the SDRAM 38. Then, the CPU 46 in step S3 starts DMA for an encode block. That is, a high level gate signal is delivered to the NTSC encoder 42. Due to this, a write request is sent to the memory control circuit 30, and the low resolution YUV data read out of the SDRAM 38 is written to the buffer 26b. The NTSC encoder 42 further processes the low resolution YUV data written on the buffer 26b. As a result, through-images are displayed on the monitor 44.

If the shutter button 54 is operated by the operator, the CPU 46 in step S5 determines "YES". Then, in step S7 the switches SW1 and SW2 are respectively connected to the signal processing circuit 22 and the black image generating circuit 41. In step S9 a gate signal to be supplied to the NTSC encoder 42 is reduced to a low level. Accordingly, the high resolution YUV data is written to the SDRAM 38 whereby a black image is displayed on the monitor 44. In step S11 it is determined whether $\frac{1}{15}$ second has been elapsed from depressing the shutter button 54 or not. If "YES", then in step S13 a gate signal to be supplied to the signal processing circuit 22 is lowered from a high level to a low level. Due to this, the writing to the SDRAM 38 is suspended.

Subsequently, in step S15 the high resolution YUV data is recorded. If the recording process has been completed, then in step S17 "YES" is determined. In respective steps of S19 and S21, the switch SW2 is returned and the gate signal to be supplied to the NTSC encoder 42 is returned to the high level. Accordingly, a freeze image is displayed in place of the black image on the monitor 44. In step S23 it is determined whether a predetermined time has elapsed from the operation of the shutter button 54 or not. If "YES", then in step S25 the switch SW1 is returned. In step S27 the gate signal to be supplied to the signal processing circuit 22 is returned in level. Then the process returns to the step S5. As a result, through-images are displayed again on the monitor 44.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital camera, comprising:
   an imaging device having an imaging surface which generates an image signal corresponding to an optical image of an objective scene;
   a processor for subjecting the image signal generated by said imaging surface to signal processes including a thinning process performed by a thinning-out circuit so as to create processed image data at a rate of one screen per a first time period;
   a memory having a single input/output port;
   a writer for writing to said memory the processed image data output from said processor;
   a reader for reading the processed image data stored in said memory at a rate of one screen per a second time period which is shorter than the first time period;
   a displayer for displaying an image based on the processed image data read out by said reader;
   a first instructor for instructing said processor to suspend the thinning process at a time of accepting a recording operation;
   a recorder for recording to a record medium the processed image data stored in said memory in response to the recording operation, and further comprising a second instructor for instructing said reader to suspend a reading process in association with an instructing process of said first instructor;
   a buffer in communication with said memory;
   a first switch; and
   a shutter button, wherein said first switch disconnects said thinning-out circuit from said buffer to disable said thinning-out circuit when said shutter button is operated.

2. A digital camera according to claim 1, wherein said memory is an SDRAM, and said writer includes a buffer for holding the processed image data output from said processor, and a transferor for transferring to said memory the processed image data held by said buffer.

3. A digital camera according to claim 1, wherein said memory has a plurality of memory areas, said digital camera further comprises a changer for changing a selecting of a memory area at an interval of the first time period, and wherein said writer writes the processed image data to one of said plurality of memory areas based on a changing result of said changer, and said reader reads the processed image data from another of said plurality of memory areas based on the changing result of said changer.

4. A digital camera according to claim 3, wherein said changer changes the selecting of the memory area in a predetermined order.

5. A digital camera according to claim 3, wherein the number of the memory areas is two, and the second time period is ½ of the first time period.

6. A digital camera according to claim 1, wherein the second time period is one over an integer of the first time period.

7. A digital camera according to claim 1, wherein said recorder records to said record medium the processed image data in a compressed state.

8. A digital camera according to claim 1, further comprising:
   an NTSC encoder in communication with said displayer;
   a black image generating circuit for supplying black image data; and
   a second switch,
   wherein said second switch connects said black image generating circuit to said NTSC encoder to supply the black image data to said NTSC encoder and display a black image on said displayer when said shutter button is operated,
   wherein the writing to said memory is suspended when the first time period has elapsed from the operating of said shutter button.

9. A digital camera, comprising:
   an imaging device having an imaging surface which generates an image signal corresponding to an optical image of an objective scene;
   a processor for subjecting the image signal generated by said imaging surface to signal processes including a thinning process so as to create processed image data;
   a memory having a single input/output port;
   a writer for carrying out a writing process to write to said memory the processed image data created by said processor at a rate of one screen per a first time period;
   a reader for carrying out, in parallel with the writing process, a reading process to read the processed image data stored in said memory at a rate of one screen per a second time period which is shorter than the first time period;
   a displayer for carrying out, in parallel with the reading process, a displaying process to display an image based on the processed image data read out from said memory;
   a first instructor for instructing said processor and said reader to suspend the thinning process and the reading process, respectively, at a time of accepting a recording operation;
   a second instructor for instructing said writer to suspend the writing process at a timing of storing in said memory specific processed image data created by said processor after an instructing process of said first instructor; and
   a recorder for recording to a record medium the specific processed image data stored in said memory.

* * * * *